United States Patent [19]
Andrus et al.

[11] 4,084,973
[45] Apr. 18, 1978

[54] GLASS ARTICLES WITH HEMATITE AND/OR MAGNETITE AND/OR METALLIC IRON SURFACES

[75] Inventors: Ronald L. Andrus, Elmira; Richard F. Reade, Corning, both of N.Y.

[73] Assignee: Corning Glass Works, Corning, N.Y.

[21] Appl. No.: 757,584

[22] Filed: Jan. 7, 1977

[51] Int. Cl.² .......................... C03C 3/22; C03B 32/00
[52] U.S. Cl. ........................................ 106/39.7; 65/32; 65/33
[58] Field of Search ...................... 65/32, 33; 106/39.7, 106/39.8

[56] References Cited

U.S. PATENT DOCUMENTS

| | | | |
|---|---|---|---|
| 3,464,806 | 9/1969 | Seki et al. | 65/32 |
| 3,557,576 | 1/1971 | Baum | 65/32 X |
| 3,639,113 | 2/1972 | Aslanova et al. | 65/32 |
| 3,790,360 | 2/1974 | Kato et al. | 65/32 |
| 3,892,904 | 7/1975 | Tanaka | 65/32 X |
| 3,902,881 | 9/1975 | Pirooz | 65/32 |
| 3,962,514 | 6/1976 | Rittler | 106/39.7 |
| 4,007,048 | 2/1977 | Sack et al. | 106/39.8 |

*Primary Examiner*—Richard V. Fisher
*Assistant Examiner*—Frank W. Miga
*Attorney, Agent, or Firm*—Clinton S. Janes, Jr.; Clarence R. Patty, Jr.

[57] ABSTRACT

The instant invention is concerned with the preparation of iron-containing glasses having compositions within the $R_2O$-$Al_2O_3$-$SiO_2$ field, wherein $R_2O$ consists of $Li_2O$, $Na_2O$, and/or $K_2O$, which spontaneously develop thin surface layers containing hematite (alpha-$Fe_2O_3$) crystals when exposed to relatively low temperature heat treatments, viz., at least about 675° C. but less than about 950° C., in an oxidizing environment. Described visually, the resulting surfaces exhibit a variety of appearances, ranging from mirror-like through lustrous metallic to dull-earthen. In all surface layers, the hematite crystals may subsequently be chemically reduced to magnetite ($Fe_3O_4$) or metallic iron crystals. Permanent magnetization can then be induced by means of the application of a strong magnetic force. The magnetite-containing surfaces can also demonstrate semiconductivity. The metallic iron surface can be highly electrically conductive.

19 Claims, No Drawings

GLASS ARTICLES WITH HEMATITE AND/OR MAGNETITE AND/OR METALLIC IRON SURFACES

BACKGROUND OF THE INVENTION

U.S. Pat. No. 3,926,602 describes the production of glass-ceramic articles from glasses having compositions within the $Li_2O$-$FeO$-$Al_2O_3$-$SiO_2$ quaternary nucleated with $TiO_2$ or a combination of $TiO_2$ and $ZrO_2$. The glasses were heat treated at about 850°-1025° C. to cause the development of beta-quartz solid solution as the predominant crystal phase in the interior of the glass-ceramic. Where a temperature of at least 1050° C. was employed, the predominant crystal phase in the interior became beta-spodumene solid solution. Simultaneously with the development of beta-quartz solid solution or beta-spodumene solid solution crystals in the interior of the so-formed glass-ceramic article, a thin, integral surface layer was produced in situ consisting essentially hematite crystals. The surface layer exhibited a metallic luster and, when produced upon previously polished surfaces, would demonstrate a mirror-like finish.

U.S. application Ser. No. 757,582, filed concurrently herewith by the present applicants, discloses the preparation of glass-ceramic articles from glasses having compositions similar to those described in U.S. Pat. No. 3,926,602, supra. Heat treatment of the glasses in an oxidizing atmosphere also produced beta-quartz solid solution or beta-spodumene solid solution as the predominant interior crystal phase, depending upon the heat treatment temperature employed, and a thin, integral surface layer containing hematitie crystals. However, the resulting glass-ceramic article was then thermally treated in a $H_2O$-containing reducing atmosphere to convert the hematite crystals to magnetite.

U.S. application Ser. No. 757,585, filed concurrently herewith by the present invention, discloses the production of highly crystalline glass-ceramic articles having an integral surface layer containing metallic iron crystals and wherein either beta-spodumene solid solution or nepheline constitutes the predominant crystal phase in the interior of the articles.

The method of that invention contemplates four basic steps:

First, a batch of the proper composition is melted;

Second, the melt is simultaneously cooled and a glass article of a desired configuration shaped therefrom;

Third, the glass article is heat treated at about 1000°-1300° C. in an oxidizing environment to cause the crystallization in situ of beta-spodumene solid solution or nepheline in the interior portion of the article while, at the same time, effecting crystallization in situ of alpha-hematite ($Fe_2O_3$) crystals in an integral thin surface layer; and Fourth, the crystallized article is exposed to an essentially dry reducing atmosphere at a temperature about 500°-800° C. to reduce the hematite in the surface layer to metallic iron.

Those glass-ceramic articles exhibit such desirable properties as low thermal expansion, i.e., coefficients of thermal expansion over the range of 25°-300° C. of about $0-15 \times 10^{-7}/°$ C., and high temperature stability. Nevertheless, the production of glass-ceramic articles requires energy to convert glasses to glass-ceramics and, even more importantly, in many applications, e.g., in electrical sealing applications, a coefficient of thermal expansion in the range of about $35-70 \times 10^{-7}/°$ C. over the temperature interval of 25°-300° C. would be extremely useful.

OBJECTIVE OF THE INVENTION

Therefore, the primary objective of this invention is to produce a glass article composed of a body portion, which is essentially free from crystallization and exhibits a coefficient of thermal expansion between about $35-70 \times 10^7/°$ C., with a thin, highly crystalline, integral surface layer containing hematite crystals which, if desired, can be thermally treated in a selected reducing environment to convert the hematite crystals in the surface layer to either magnetite or metallic iron crystals.

SUMMARY OF THE INVENTION

That objective can be accomplished in glass compositions consisting essentially, in weight percent on the oxide basis, of 1-15% $R_2O$, wherein $R_2O$ consists of 0-10% $Li_2O$ and 0-15% $Na_2O$ and/or $K_2O$, 0.3-13% FeO, 15-35% $Al_2O_3$, 55-80% $SiO_2$, and 0-5% $TiO_2$ and/or $ZrO_2$. The operable glasses of the invention can be classified into two broad groups depending upon the presence or absence of nucleating agents such as $TiO_2$ and/or $ZrO_2$.

Group 1 consists essentially of $R_2O$-$FeO$-$Al_2O_3$-$SiO_2$ compositions free from $TiO_2$ and/or $ZrO_2$. Such glasses cannot be converted into glass-ceramic articles.

Group 2 compositions contain $TiO_2$ and/or $ZrO_2$ and this group can be classified into three subdivisions. The first contain too little $TiO_2$ and/or $ZrO_2$ (less than about 2% by weight) to produce the fine-grained body crystallization typical of a glass-ceramic. Such glasses yield weak materials wherein crystallization originates at the surface and, commonly, only a devitrified surface layer is developed when the glass is subjected to the high temperature heat treatments customarily utilized in converting glasses to glass-ceramic articles. The second subdivision contains $TiO_2$ and/or $ZrO_2$ levels known to yield glass-ceramic articles in some compositions, but in low $R_2O$ (less than about 3% by weight) and high FeO (more than about 5% FeO) glasses a coarse-grained structure is produced which can also have such unwanted crystal phases as cristobalite. The third subdivision contains sufficient $TiO_2$ and/or $ZrO_2$ to form glass-ceramic articles and the glass compositions are such as to yield fine-grained bodies when converted via high temperature heat treatment into glass-ceramics.

The instant invention is founded in the discovery that highly crystalline hematite surfaces exhibiting mirror-like, lustrous metallic, or earthen appearances can be developed on iron-containing glass articles exhibiting coefficients of thermal expansion between about $35-70 \times 10^7/°$ C. over the temperature range of about 25°-300° C. without the need to crystallize the body of the glass to a glass-ceramic. Thus, hematite surface layers can be readily developed in situ on glasses which cannot be converted into fine-grained glass-ceramics as well as those that can be converted. The hematite crystals can, if desired, be thermally reduced to magnetite or metallic iron.

The method of the invention contemplates the following three general steps:

(1) a batch suitable for producing a glass having a composition within the above-delineated range of constituents is melted;

(2) the melt is simultaneously cooled to a temperature at least below the transformation range and a glass article of a desired geometry shaped therefrom; and then (3) the glass article is subjected to a temperature of at least about 675° C., but less than about 950° C., in an oxidizing atmosphere for a period of time sufficient to cause the growth in situ of hematite crystals in a thin surface layer, the hematite crystals constituting at least 50% by volume of the surface layer.

Where a magnetite surface layer is desired, the article resulting from Step (3) supra is exposed to a $H_2O$-containing reducing atmosphere at a temperature between about 450°–650° C. for a period of time sufficient to reduce the hematite crystals in the surface layer to magnetite. Where a metallic iron surface layer is desired, the article resulting from Step (3) supra is exposed to an essentially dry reducing atmosphere at a temperature between about 450°–650° C. for a period of time sufficient to reduce the hematite crystals in the surface layer to metallic iron. In both cases, the article is cooled to room temperature in the respective reducing atmosphere.

Experience has indicated that the electrically conductive and/or magnetic properties demonstrated in the final product will often be much improved when the integral surface layer of hematite crystals is contacted with hot mineral acid prior to being exposed to the hot reducing environment. Therefore, this contact constitutes the preferred practice of the present invention. Nitric acid ($HNO_3$) has been found to be the most suitable acid for this application. Hydrochloric acid (HCl), phosphoric acid ($H_3PO_4$), and sulfuric acid ($H_2SO_4$) have also been effective, but caution must be exercised with their use to avoid attack of the hematite surface layer.

DESCRIPTION OF PREFERRED EMBODIMENTS

Table I records a group of glass compositions, expressed in parts by weight on the oxide basis, which illustrates the compositional parameters of the instant invention. Inasmuch as the sum of the components of the various examples totals or closely approximates 100, the compositions can reasonably be deemed to be expressed in weight percent.

The actual ingredients of the batch can comprise any materials, either the oxides or other compounds, which, upon being melted together, will be converted into the desired oxide in the proper proportions. The batch ingredients will be compounded, blended together in a ball mill to assist in obtaining a homogeneous melt, and thereafter deposited into platinum crucibles. The crucibles can be placed in a gas-fired furnace, the batch melted at about 1550°–1675° C. for about 16 hours, the melts rolled into glass plates having dimensions of about $10 \times 4 \times \frac{1}{2}$ inch, and the plates transferred immediately to an annealer operating at about 500°–700° C., depending upon the glass composition. $As_2O_3$ was included in a number of the compositions in its conventional role as a firing agent.

In the laboratory, the glass plates will be cooled to room temperature to allow examination of the samples for glass quality and will be annealed to permit the sawing thereof into various test pieces. Nevertheless, this cooling to room temperature is not required for operability of the instant invention, but the glass articles must be cooled to a temperature at least below the transformation range before being subjected to the heat treatment producing the in situ surface crystallization of hematite. (The transformation range has been defined as that temperature at which a glass melt is deemed to have been converted into an amorphous solid, that temperature generally being considered to lie in the vicinity of the annealing point of the glass).

TABLE I

|  | 1 | 2 | 3 | 4 | 5 | 6 | 7 | 8 | 9 | 10 |
|---|---|---|---|---|---|---|---|---|---|---|
| $SiO_2$ | 59.9 | 59.7 | 71.0 | 72.8 | 71.8 | 55.8 | 76.5 | 71.4 | 70.8 | 69.4 |
| $Al_2O_3$ | 26.4 | 26.4 | 22.4 | 20.7 | 21.7 | 33.7 | 17.3 | 20.9 | 21.4 | 20.3 |
| $Li_2O$ | 5.8 | 5.6 | 5.0 | 5.2 | 5.2 | 8.6 | 4.1 | 5.1 | 5.1 | 5.8 |
| FeO | 0.4 | 0.8 | 1.0 | 1.4 | 1.4 | 1.5 | 1.5 | 2.1 | 2.8 | 4.1 |
| $As_2O_3$ | — | — | 0.5 | — | — | 0.4 | 0.5 | 0.5 | — | 0.5 |
| $P_2O_5$ | 7.5 | 7.5 | — | — | — | — | — | — | — | — |

|  | 11 | 12 | 13 | 14 | 15 | 16 | 17 | 18 | 19 | 20 |
|---|---|---|---|---|---|---|---|---|---|---|
| $SiO_2$ | 69.5 | 68.1 | 66.4 | 68.5 | 69.0 | 65.5 | 58.9 | 74.8 | 70.2 | 63.1 |
| $Al_2O_3$ | 20.3 | 21.8 | 21.3 | 21.9 | 22.4 | 21.0 | 25.0 | 17.5 | 20.5 | 23.2 |
| $Li_2O$ | 3.5 | 2.5 | 2.4 | 2.5 | 5.0 | 2.4 | — | 4.0 | 4.7 | 2.4 |
| FeO | 6.2 | 2.0 | 2.0 | 2.0 | 2.1 | 1.9 | 1.4 | 1.5 | 3.1 | 6.7 |
| $As_2O_3$ | 0.5 | 0.5 | 0.5 | 0.5 | 0.5 | 0.5 | 0.2 | 0.4 | 0.5 | 0.5 |
| $Na_2O$ | — | 5.1 | — | — | — | — | 14.6 | — | — | — |
| $K_2O$ | — | — | 7.5 | — | — | — | — | — | — | — |
| CaO | — | — | — | 5.6 | — | — | — | — | — | — |
| CdO | — | — | — | — | 1.0 | — | — | — | — | — |
| $La_2O_3$ | — | — | — | — | — | 8.5 | — | — | — | — |
| $TiO_2$ | — | — | — | — | — | — | — | 1.3 | 1.0 | 3.0 |
| $ZrO_2$ | — | — | — | — | — | — | — | 0.5 | — | 1.2 |

|  | 21 | 22 | 23 | 24 | 25 |
|---|---|---|---|---|---|
| $SiO_2$ | 65.4 | 57.9 | 63.8 | 69.5 | 70.9 |
| $Al_2O_3$ | 19.1 | 26.7 | 18.7 | 20.3 | 20.7 |
| $Li_2O$ | 2.5 | 1.9 | 1.1 | 4.7 | 4.7 |
| FeO | 7.7 | 9.2 | 11.3 | 3.1 | 3.1 |
| $As_2O_3$ | 0.5 | 0.4 | 0.4 | 0.5 | 0.5 |
| $TiO_2$ | 4.8 | 2.7 | 4.7 | 2.1 | — |
| ZnO | — | 1.1 | — | — | — |

Table II reports various heat treatments applied to the compositions of Table I and the appearance of the resulting hematite-containing surface layer developed in situ on the articles. X-ray diffraction analyses of the heat treated glasses demonstrated the essential absence of crystallization in the interior of the glass bodies. Reflection electron diffraction techniques were employed to study the crystallization in the very thin surface layer.

In the following heat treatments, the glasses were placed within an electrically-fired furnace and the temperature raised in an atmosphere of air at about 300° C./hour. As a matter of convenience, a dwell period at a specific temperature was employed. Such is not necessary, however, the only requirement being that the glass body be held within the 675°-950° C. range for a sufficient length of time in an oxidizing environment to grow the surface layer of hematite crystals. At the conclusion of the heat treatment, the surface-crystallized articles were cooled to room temperature at furnace rate, i.e., the electric power was simply cut off and the furnace allowed to cool with the articles retained therewithin. This cooling rate was estimated to average about 3°-5° C./minute. Numerous variations in heating and cooling rates are possible, of course, and such are believed to be well-within the ingenuity of the person of ordinary skill in the art.

However, the heat treatment of the glass articles must be undertaken under oxidizing conditions to cause the formation of a substantial integral surface layer containing hematite crystals. Firing in a reducing or neutral environment results in a glassy surface layer with very little, if any, crystallization present. The development of the hematite crystallization is also a sine qua non for the subsequent production of magnetite or iron through the reduction of the hematite crystals, as will be shown hereinafter.

Measurements of the coefficient of thermal expansion were conducted on Examples 6, 7, and 24 with the following results:

| Example No. | 25° – 300° C. | 25° –600° C. |
|---|---|---|
| 6 | 53 | 60 |
| 7 | 40 | 45 |
| 24 | 40 | — |

TABLE II

| Example No. | Heat Treatment | Appearance |
|---|---|---|
| 1 | 750° C.-12 hours | Hazy, transparent |
| 2 | 750° C.-12 hours | Thin mirror |
| 3 | 750° C.-5 hours | Brassy mirror |
| 4 | 785° C.-5 hours | Earthen red-brown |
| 5 | 750° C.-12 hours | Semi-gloss violet-brown |
| 6 | 725° C.-12 hours | Dull violet |
| 7 | 750° C.-5 hours | Dull violet |
| 8 | 750° C.-12 hours | Semi-gloss violet-brown |
| 9 | 750° C.-12 hours | Dull violet-brown |
| 10 | 700° C.-5 hours | Lustrous violet-gray |
| 11 | 750° C.-12 hours | Semi-lustrous violet |
| 12 | 750° C.-5 hours | Silver mirror |
| 13 | 750° C.-5 hours | Thin mirror |
| 14 | 750° C.-5 hours | Thin mirror |
| 15 | 750° C.-5 hours | Silver mirror |
| 16 | 750° C.-5 hours | Thin mirror |
| 17 | 925° C.-16 hours | Silver mirror |
| 18 | 800° C.-4 hours + 875° C.-1 hour | Metallic luster |
| 19 | 775° C.-2 hours + 800° C.-1 hour | Metallic luster |
| 20 | 800° C.-6 hours | Brassy mirror |
| 21 | 700° C.-5 hours | Steely mirror |
| 22 | 800° C.-6 hours | Brassy mirror |
| 23 | 700° C.-5 hours | Thin mirror |
| 24 | 775° C.-2 hours + 800° C.-1 hour | Brassy mirror |
| 25 | 700° C.-5 hours | Silver mirror |

Examples 1-11 and 25 illustrate the development of surface layers containing hematite crystals on simple glass compositions free from $TiO_2$ and $ZrO_2$. Examples 1 and 2 demonstrate the in situ growth of hematite at low iron levels. For example, glasses containing about 0.4% FeO and 4% $TiO_2$ will not develop a hematite surface on a highly crystalline, fine-grained beta-quartz glass-ceramic body after a heat treatment at 800° C. for four hours followed by 4 hours at 875° C.

Examples 12-16 illustrate that hematite surface layers can be developed in situ at low temperatures on glass compositions containing various additional oxides. Such oxides are frequently added to the $R_2O-Al_2O_3$-$SiO_2$ base composition to improve the melting and forming characteristics thereof, as well as to modify the physical properties of the final product. In general, however, these additions will be limited to less than about 10% total.

Example 17 is a hard sodium aluminosilicate glass approximately corresponding to the stoichiometry of the mineral jadeite ($Na_2O.Al_2O_3.4SiO_2$). This glass demands a high temperature heat treatment to develop the desired integral hematite surface layer, but is unusual in that it yields a good silvery mirror-like surface without the presence of $TiO_2$ and/or $ZrO_2$. In contrast, hematite surface layers can be developed on softer, lower silica glasses corresponding to the nepheline stoichiometry, $Na_2O.Al_2O_3.2SiO_2$, at about 800° C.

As has been pointed out above, a major distinction existing among the glasses of the instant invention is the presence or absence of nucleating agents such as $TiO_2$ or $ZrO_2$. These agents can serve to not only nucleate the glass to a fine-grained glass-ceramic, but also strongly influence the development and appearance of the integral hematite-containing surface layer. The presence of these agents acts to retard and control the in situ development of the surface crystallization such that thin, mirror-like film development, about 500-600A thick, is favored. In addition, these ingredients tend to stabilize the mirror-like films, enabling them to retain their reflectivity to temperatures as high as 900°-1000° C., depending upon other compositional factors.

Glasses entirely free from $TiO_2$ and $ZrO_2$ can be heat treated so as to develop mirror surfaces, but such are commonly difficult to control and stabilize. Hence, such glasses are more prone to develop thicker surface layers exhibiting a lustrous or earthen appearance, even at low temperatures. By way of comparison, Application Ser. No. 757,582, referred to supra, describes the production of similarly-thick, eartnen surfaces on beta-spodumene solid solution-containing glass-ceramics which require temperatures of 1200°-1250° C. This interraction of $TiO_2$ and/or $ZrO_2$ with iron can be manipulated very effectively in glasses where nucleation is not a constraint. Hence, highly reflecting, $TiO_2$-stabilized mirrors, metallic lusters on low $TiO_2$ glasses, and thick earthen surfaces on $TiO_2$-free glasses, can all be developed at temperatures in the 700°-800° C. range.

Examples 18 and 19 represent glasses containing an insufficient quantity of $TiO_2$ and/or $ZrO_2$ to cause the production of fine-grained glass-ceramics, but containing an adequate amount to develop hematite surfaces demonstrating a metallic (but not mirror-like) luster over the temperature range employed.

Examples 20-23 illustrate the capability of $TiO_2$ and/or $ZrO_2$ to stabilize mirror-like hematite surfaces even at very high iron levels. Example 24 contains about the minimum quantity of $TiO_2$ that can result in a glass-ceramic in this base composition system. However, the stated heat treatment is at a sufficiently low temperature such that no body crystallization takes place, but a mirror-like hematite-containing surface layer is produced.

Example 25 is illustrative of a composition which, when heat treated in a particular manner, will yield a highly-reflective, silvery mirror-like surface which can be stabilized at low temperatures in $Li_2O-Al_2O_3-SiO_2$ glasses free from $TiO_2$ and $ZrO_2$.

Table III lists various thermal treatments applied to the hematite-surfaced bodies reported in Table II to reduce the hematite to magnetite. Whereas not necessary, the preferred practice of the invention involves contacting the hematite surface layer with a mineral acid such as nitric acid, sulfuric acid, phosphoric acid, or hydrochloric acid. Hot concentrated and dilute nitric acid, dilute sulfuric acid, dilute phosphoric acid, and dilute hydrochloric acid are operable to improve the magnetic properties of the final product. Hot concentrated sulfuric acid, phosphoric acid, and hydrochloric acid dissolve the hematite surface layer so must be utilized with caution, if used at all. The reaction mechanism by which the acid treatment enhances the magnetic properties is not completely understood. However, it is believed that the acid removes tramp contaminants introduced through manual handling and/or exposure to the ambient environment, and eliminates any superjacent glassy film which may be present at the surface. The mirror-like surfaces frequently take on a brighter, more reflecting appearance following the treatment in acid, suggesting that a film has been removed from the surface to expose the hematite. Whatever the mechanism, Table III illustrates that a brief treatment in boiling concentrated nitric acid was utilized more-or-less routinely in the survey of compositions found to be operable in the invention. Although, as was observed above, cold or room temperature concentrated nitric acid, hydrochloric acid, phosphoric acid, and/or sulfuric acid can be effective, boiling or near-boiling nitric acid was commonly employed in the composition survey, since it substantially improved the magnetic properties in many instances and did not seem to deleteriously affect those properties in any example. Moreover, the solubility of $Fe_2O_3$ is significantly lower in $HNO_3$ than in either HCl, $H_3PO_4$, or $H_2SO_4$. Therefore, its use minimizes acid attack of the $Fe_2O_3$ surface layer itself. In general, the contact of the glass article with acid will not exceed about 10 minutes.

Subsequent to the acid immersion, where employed, the glass articles will be exposed to a $H_2O$-containing reducing environment at temperatures ranging between about 450°–650° C. Various atmospheres can be employed for this purpose which do not deleteriously attack the hematite surfaces. Thus, such commonly-used $H_2O$-containing gaseous mixtures as combinations of hydrogen with steam and carbon dioxide with carbon monoxide can be effective to reduce the hematite crystals to magnetite. However, the use of wet forming gas (92% by volume nitrogen and 8% by volume hydrogen) is preferred because it does not present the safety hazards of hydrogen alone, coupled with the advantages that it is convenient to use and is relatively inexpensive. Hence, in the following table, forming gas was passed through a column of distilled water and then into a heated chamber at a flow rate of about 100 cc/min. The gas was discharged out of the heated chamber into a laboratory hood.

With few exceptions, the appearance of the article surfaces after treatment in the hot reducing environment was much darker than that of the original surfaces. Thus, in general, the reduced surface layer assumed a dark gray-to-black coloration which would be expected to result from the conversion of hematite to crystals having the structure of magnetite, $Fe_3O_4$ or $FeO.Fe_2O_3$. X-ray diffraction analyses and reflection electron diffraction analyses of the surface layers have indicated the presence of magnetite therein. Such analyses have also pointed to the presence, in very minor amounts, of other crystal phases in certain examples, but positive identification of these phases has not as yet been possible.

After the glasses were subjected to the wet forming gas atmosphere, the articles were magnetized and the magnetic properties determined by applying a strong magnetic field thereto. The strength of the magnetic field was increased until the article was magnetically saturated. Thereafter, the applied field was reduced to zero and the degree of permanent magnetization exhibited by the test sample was measured in terms of the remanent magnetic flux, as expressed in Maxwells/cm. The coercive force, measured in Oersteds, required to demagnetize the article was determined by applying an increasing magnetic field of reverse polarity. The values for those properties are also recorded in Table III.

TABLE III

| Ex. No. | Acid Boil | Wet Forming Gas | Remanent Flux | Coercive Force |
|---|---|---|---|---|
| 1 | 2 min. conc. $HNO_3$ | 550° C. - 5 hours | 0.012 | 506 |
| 2 | " | " | 0.031 | 476 |
| 3 | " | 525° C. - 2 hours | 0.043 | 398 |
| 4 | " | " | 0.037 | 457 |
| 5 | 2 min. 10 vol.% HCl | 525° C. - 5 hours | 0.043 | 463 |
| 6 | 2 min. conc. $HNO_3$ | 535° C. - 5 hours | 0.066 | 494 |
| 7 | " | 550° C. - 5 hours | 0.026 | 520 |
| 8 | " | " | 0.053 | 520 |
| 9 | 2 min. 10 vol.% HCl | 525° C. - 5 hours | 0.074 | 442 |
| 10 | 3 min. conc. $HNO_3$ | 550° C. - 5 hours | 0.094 | 404 |
| 11 | 2 min. conc. $HNO_3$ | " | 0.698 | 8 |
| 12 | " | 525° C. - 2 hours | 0.034 | 258 |
| 13 | " | " | 0.014 | 498 |
| 14 | " | " | 0.017 | 585 |
| 15 | " | " | 0.022 | 434 |
| 16 | " | " | 0.011 | 515 |
| 17 | " | " | 0.046 | 471 |
| 18 | " | 535° C. - 5 hours | 0.041 | 618 |
| 19 | 3 min. conc. $HNO_3$ | 550° C. - 5 hours | 0.245 | 5780 |
| 20 | 2 min. conc. $HNO_3$ | 535° C. - 5 hours | 0.029 | 655 |
| 21 | 3 min. conc. $HNO_3$ | " | 0.020 | 542 |
| 22 | 2 min. conc. $HNO_3$ | " | 0.045 | 422 |
| 23 | " | " | 0.010 | 470 |
| 24 | 3 min. conc. $HNO_3$ | 550° C. - 5 hours | 0.025 | 555 |

As was explained above, the presence of hematite crystals in the surface of the glass articles is mandatory for the development of magnetite (or iron). Hence, the hematite crystals will be reduced upon firing under reducing conditions to magnetite or iron. In contrast, firing the glass originally in a reducing environment will not yield a highly crystalline surface layer containing magnetite or iron, but leaves an essentially glassy surface.

Table IV reports several process variables and their effects on the magnetic properties of the resulting magnetite-containing surfaces. The measurements indicate that thicker hematite surfaces induced by higher temperature and/or longer time initial heat treatments yield surfaces having superior magnetic properties. Also, the variable efficacy of immersion in boiling concentrated $HNO_3$ is demonstrated. Thus, Runs 7 and 8 of Example 3 manifested little effect, whereas Runs 14 and 15 of Example 15 illustrate that the treatment of $HNO_3$ spells the difference between the development of magnetic and non-magnetic surfaces. The initial heat treatment of the glass in air to develop the hematite-containing surface layer, the immersion in boiling acid, and the exposure to wet forming gas were employed in a manner similar to the examples reported in Tables II and III above.

force has been removed. Therefore, whereas such materials can have many applications, they are not at all

TABLE IV

| Run | Example No. | Initial Air Firing | Acid Boil | Wet Forming Gas | Remanent Flux | Coercive Force |
|---|---|---|---|---|---|---|
| 1 | 3 | 750° C. - 5 hours | 2 min. conc. $HNO_3$ | 525° C. - 2 hours | 0.043 | 398 |
| 2 | 3 | " | 5 min. conc. $HNO_3$ | " | 0.055 | 491 |
| 3 | 3 | " | 2 min. 10 vol. % $HNO_3$ | " | 0.057 | 455 |
| 4 | 3 | " | 2 min. conc. HCl | " | 0.014 | 442 |
| 5 | 3 | " | 2 min. 10 vol. % HCl | " | 0.058 | 422 |
| 6 | 3 | 750° C. - 10 hours | 2 min. conc. $HNO_3$ | " | 0.063 | 393 |
| 7 | 3 | 775° C. - 5 hours | " | " | 0.061 | 428 |
| 8 | 3 | " | None | " | 0.062 | 435 |
| 9 | 3 | None | 2 min. conc. $HNO_3$ | " | Non-Magnetic | |
| 10 | 4 | 785° C. - 5 hours | " | 475° C. - 2 hours | 0.003 | 448 |
| 11 | 4 | " | " | 525° C. - 2 hours | 0.037 | 457 |
| 12 | 4 | " | " | 575° C. - 2 hours | 0.032 | 428 |
| 13 | 4 | " | " | 600° C. - 2 hours | 0.032 | 525 |
| 14 | 15 | 750° C. - 5 hours | None | 525° C. - 2 hours | Non-Magnetic | |
| 15 | 15 | " | 2 min. conc. $HNO_3$ | " | 0.022 | 434 |

The product resulting from Run 4 of Table IV, illustrating the lowest remanent flux, points up the greater solubility of $Fe_2O_3$ in HCl than in $HNO_3$. Thus, the use of $HNO_3$ is much to be preferred.

Also, Run 9 of Table IV demonstrates that magnetic properties cannot be imparted to the glasses through treatment in a wet reducing atmosphere alone. Hence, there must be an initial firing at about 675°–950° C. to achieve the desired hematite-containing surface layer which can subsequently be reduced to magnetite. This capability of independently varying the initial heat treatment and the subsequent reducing firing permits the obtaining of a broad spectrum of properties in the final product.

The high degree of magnetization coupled with the moderate levels of coercive force demonstrated by the magnetite surfaces of Examples 6, 8, 9, and 10 render them suitable for magnetic recording, storage, and erasing applications.

Through the careful removal of the magnetite-containing surface layers of Examples 5 and 9 with concentrated HCl, surface thicknesses of 770A and 1600A, respectively, were determined from weight loss measurements. Magnetization per gram (a material's property) calculations for Examples 5 and 9 indicatecd values of 85 and 71 E.M.U., respectively. For comparison, pure magnetite has a value of 93 E.M.U. per gram.

Example 10 is representative of an iron oxide level approaching the maximum which can be included in a $TiO_2$ and/or $ZrO_2$-free glass without hazarding the growth of magnetic phases in the interior of the glass body, thereby altering the nature of the resultant magnetic properties. Example 11 has an iron content above this maximum and exhibits magnetic properties characterized by very high magnetization and extremely low coercive force. Such high permeability materials can be readily magnetized and demagnetized. They can, for example, be picked up by a small hand magnet, but their magnetization is immediately lost once the magnetizing force has been removed. Therefore, whereas such materials can have many applications, they are not at all suitable for the magnetic storage of information.

The magnetic properties of Example 17 are considered to be surprisingly good in view of the low iron level therein.

The behavior of Example 19 is adjudged to be unique in that it produces a magnetite-containing surface with both high magnetization and high coercive force. Yet, X-ray diffraction analysis does not detect a magnetic crystal phase in the interior of the glass article after the surface layer has been etched off. Example 19 is ill-suited for applications where magnetic recording and erasing capability is required, but is eminently suited for applications demanding a hard, permanent magnetic surface.

In addition to their useful magnetic properties, the magnetite-containing surfaces developed in situ on the instant glasses can exhibit varying degrees of semiconductivity. Table VI reports surface resistivity measurements conducted at room temperature on several of the exemplary compositions recited in Table I, along with the preliminary heat treatment and subsequent reducing treatment applied to each. The resistivities are recorded in terms of ohms/square.

TABLE V

| Example No. | Heat Treatment | Acid Boil | Wet Forming Gas | Surface Resistivity |
|---|---|---|---|---|
| 2 | 750° C. - 12 hours | 2 min. conc. $HNO_3$ | 550° C. - 5 hours | $9.9 \times 10^4$ |
| 3 | 775° C. - 5 hours | " | 525° C. - 2 hours | 6640 |
| 3 | " | None | 525° C. - 5 hours | 7174 |
| 4 | 785° C. - 5 hours | 2 min. conc. $HNO_3$ | 525° C. - 2 hours | 5720 |
| 12 | 750° C. - 5 hours | " | " | 3125 |
| 13 | " | " | " | $6.9 \times 10^4$ |
| 14 | " | " | " | $4.1 \times 10^5$ |
| 20 | 800° C. - 6 hours | " | 535° C. - 5 hours | $3.5 \times 10^4$ |
| 21 | 700° C. - 5 hours | 3 min. conc. $HNO_3$ | " | $6.3 \times 10^4$ |
| 24 | 775° C. - 2 hours + 800° C. - 1 hour | " | 550° C. - 5 hours | 7480 |

With the exception of Example 14, the surface resistivity values reported in Table V are generally lower than those exhibited by magnetite-containing surfaces developed in situ on glass-ceramic substrates. The latter articles commonly demonstrate surface resistivities within the range of about $10^5$–$10^7$ ohms/square. Such difference may be due to lower impurity levels in the crystals or the presence of less glassy film.

Table VI reports various reducing treatments applied to several of the glass articles fof Table II having an integral surface layer containing hematite, whereby the hematite crystals were reduced to metallic iron. Again, whereas not required, the preferred practice contemplates contacting the hematite surface layer with a mineral acid such as nitric acid, hydrochloric acid, phosphoric acid, or sulfuric acid prior to the reducing treatment. Example 4 of the Table dramatically illustrates the beneficial effect which the acid treatment can provide in improving the magnetic and electrical properties of certain glass compositions.

Following the acid treatment, where utilized, the glass articles will be exposed to an essentially dry reducing environment at temperatures ranging between about 450°–650° C. Because $H_2O$ must be essentially absent from the atmosphere, the use of dry hydrogen and, more preferably, a dry mixture of hydrogen and nitrogen is customary. To insure the removal of water from the treating chamber may require baking at an elevated temperature, followed by purging with the dry reducing atmosphere, prior to introducing the hematite-surfaced article therein. That practice was used with the examples reported in Table V.

Dry forming gas (92% by volume nitrogen and 8% by volume hydrogen) constituted the reducing gaseous atmosphere employed. This gas is preferred since it does not introduce the hazard of explosion inherent in atmospheres of high hydrogen concentration.

The iron-surfaced articles exhibited a generally darker appearance than as seen in Table II, frequently taking on a dull-gray or glassy-black hue reminescent of cast iron. The presence of iron crystals in the surface layer was identified through reflection electron diffraction.

(It is apparent that, if desired, the magnetite surface layers produced through the reduction of hematite via the use of a wet reducing atmosphere can be further reduced to metallic iron crystals through the use of a dry reducing atmosphere. The use of such a two-step process is, of course, unattractive from a practical point of view.)

Although the mechanism of reduction operating in the dry reducing atmosphere, as contrasted with that working in the wet reducing atmosphere to produce magnetite, has not been fully explained, it is believed that partial decomposition of the $H_2O$ in the wet atmosphere during the firing provides a small partial pressure of oxygen sufficient to stabilize magnetite. The absence of this small partial pressure of oxygen results in the reduction continuing to produce metallic iron.

However, notwithstanding this lack of full knowledge with respect to operating mechanism, it has been shown that the same parameters of time and temperature are operable in both reducing atmospheres.

thick surface layer, viz., up to about 2000A in thickness, and the hazard of developing crystallization within the body of the glass through high temperature and/or long time exposure. Thus, experience has shown that a period of at least about one hour will normally be required to insure the growth of a substantial surface layer. Exposures in excess of about 16 hours are economically unattractive and, even where no internal crystallization is developed, are not looked upon with favor since the crystallization frequently becomes coarse and surface cracking and/or spalling occurs. The preferred practice contemplates about 3–6 hours at about 700°–800° C., with the empirical determination of the proper time and temperature required for a particular glass composition to achieve the desired crystallization being well within the skill of a component glass technologist.

In a similar manner, the rate of reduction of hematite to magnetite or metallic iron is a function of time and temperature. Hence, at temperatures below about 450° C., the conversion of hematite to magnetite or metallic iron becomes so slow as to be economically unattractive, whereas at temperatures above about 650° C., poor electrically conductive and magnetic properties, as well as grain growth, are hazarded. Therefore, the preferred practice involves temperatures between about 500°–600° C. and exposure periods of about 2–5 hours. However, times as short as about one hour may be sufficient to cause thermal reduction, and exposures as long as 12 hours may be practical. Here again, the empirical determination of the proper time and temperature for a specific glass composition to achieve the desired reduction of hematite is well within the skill of a competent glass technologist.

We claim:

1. A method for making a glass article composed of a body portion essentially free from crystallization with an integral surface layer containing hematite crystals dispersed within a glassy matrix, said surface layer being highly crystalline exhibiting a mirror-like appearance, a metallic luster appearance, or a dull earthen appearance, consisting of the steps of:
   (a) melting a batch for a glass consisting essentially, in weight percent on the oxide basis, of about 1–15% $R_2O$, wherein $R_2O$ consists of 0–10% $Li_2O$ and 0–15% $Na_2O$ and/or $K_2O$, 0.3–13% FeO, 15–35% $Al_2O_3$, 55–80% $SiO_2$, and 0–5% $TiO_2$ and/or $ZrO_2$;
   (b) simultaneously cooling the melt to at least below the transformation range and forming a glass arti-

TABLE VI

| Example No. | Heat Treatment | Acid Boil | Dry Forming Gas | Remanent Flux | Coercive Force | Surface Resistivity Ohms/Square |
|---|---|---|---|---|---|---|
| 4 | 785° C. - 5 hours | None | 525° C. - 2 hours | Feeble Magnetism | | Non-conductive |
| 4 | 785° C. - 5 hours | 2 min. conc. $HNO_3$ | 525° C. - 2 hours | 0.036 | 666 | 158 |
| 15 | 750° C. - 5 hours | " | 525° C. - 2 hours | 0.018 | 337 | — |
| 19 | 700° C. - 5 hours | " | 525° C. - 2 hours | — | — | $1.9 \times 10^4$ |
| 24 | 700° C. - 5 hours | " | 525° C. - 2 hours | — | — | $4.5 \times 10^4$ |
| 25 | 700° C. - 5 hours | " | 525° C. - 2 hours | — | — | 1800 |

The development of surface layers containing hematite crystals dispersed in a glassy matrix is time and temperature dependent. Hence, higher temperatures commonly lead to the more rapid growth of the hematite crystals. However, higher temperatures, and particularly in those compositions containing $TiO_2$ and/or $ZrO_2$, are prone to cause the growth of crystals in the interior of the glass with a consequent lowering of the coefficient of thermal expansion. Therefore, a compromise must be struck between the desire for rapid growth of crystallization and the development of a relatively cle therefrom;
   (c) exposing said glass article in an oxidizing atmosphere to a temperature between about 675°–950° C. for a period of time sufficient to cause the growth of hematite crystals in situ in an integral surface layer on said glass article; and then
   (d) cooling said article to room temperature.

2. A method according to claim 1 wherein said glass article is exposed to a temperature between about 675°–950° C. for about 1–16 hours.

3. A method according to claim 1 wherein said glass article is exposed to a temperature between about 700°–800° C. for about 3–6 hours.

4. A method according to claim 1 wherein said surface layer is no more than about 2000A thick.

5. A surface crystallized glass article made in accordance with method claim 1.

6. A method for making a glass article composed of a body portion essentially free from crystallization with an integral surface layer containing magnetite crystals dispersed within a glassy matrix, said surface layer being highly crystalline and exhibiting a mirror-like appearance, a metallic luster appearance, or a dull earthen appearance, consisting of the steps of:
 (a) melting a batch for a glass consisting essentially, in weight percent on the oxide basis, of about 1–15% $R_2O$, wherein $R_2O$ consists of 0–10% $Li_2O$ and 0–15% $Na_2O$ and/or $K_2O$, 0.3–13% FeO, 15–35% $Al_2O_3$, 55–80% $SiO_2$, and 0–5% $TiO_2$ and/or $ZrO_2$;
 (b) simultaneously cooling the melt to at least below the transformation range and forming a glass article therefrom;
 (c) exposing said glass article in an oxidizing atmosphere to a temperature between about 675°–950° C. for a period of time sufficient to cause the growth of hematite crystals in situ in an integral surface layer on said glass article;
 (d) exposing said surface-crystallized glass article to a $H_2O$-containing reducing environment at a temperature between about 450°–650° C. for a period of time sufficient to reduce the hematite crystals in said surface layer to magnetite crystals; and then
 (e) cooling said article to room temperature.

7. A method according to claim 6 wherein said glass article having the integral surface layer containing hematite crystals is contacted with a mineral acid prior to being exposed to said reducing environment.

8. A method according to claim 7 wherein said mineral acid is selected from the group consisting of $HNO_3$, HCl, $H_3PO_4$, and $H_2SO_4$.

9. A method according to claim 6 wherein said $H_2O$-containing reducing environment consists of wet forming gas (92% by volume $N_2$ – 8% by volume $H_2$).

10. A method according to claim 6 wherein said glass article having the integral surface layer containing hematite crystals is exposed to a $H_2O$-containing reducing environment at a temperature between about 450°–650° C. for about 1–12 hours.

11. A method according to claim 10 wherein said glass article is exposed to a $H_2O$-containing reducing environment at a temperature between about 500°–600° C. for about 2–5 hours.

12. A method according to claim 6 wherein said surface layer is no more than about 2000A thick.

13. A method for making a glass article composed of a body portion essentially free from crystallization with an integral surface layer containing metallic iron crystals dispersed within a glassy matrix, said surface layer being highly crystalline and exhibiting a dull or earthen appearance, consisting of the steps of:
 (a) melting a batch for a glass consisting essentially, in weight percent on the oxide basis, of about 1–15% $R_2O$, wherein $R_2O$ consists of 0–10% $Li_2O$ and 0–15% $Na_2O$ and/or $K_2O$, 0.3–13% FeO, 15–35% $Al_2O_3$, 55–80% $SiO_2$, and 0–5% $TiO_2$ and/or $ZrO_2$;
 (b) simultaneously cooling the melt to at least below the transformation range and forming a glass article therefrom;
 (c) exposing said glass article in an oxidizing atmosphere to a temperature between about 675°–950° C. for a period of time sufficient to cause the growth of hematite crystals in situ in an integral surface layer on said glass article;
 (d) exposing said surface-crystallized to a dry reducing environment at a temperature between about 450°–650° C. for a period of time sufficient to reduce the hematite crystals in said surface layer to metallic iron crystals; and then
 (e) cooling said article to room temperature.

14. A method according to claim 13 wherein said glass article having the integral surface layer containing hematite crystals is contacted with a mineral acid prior to being exposed to said reducing environment.

15. A method according to claim 14 wherein said mineral acid is selected from the group consisting of $HNO_3$, HCl, $H_3PO_4$, and $H_2SO_4$.

16. A method according to claim 13 wherein said reducing environment consists of dry forming gas (92% by volumne $N_2$ – 8% by volume $H_2$).

17. A method according to claim 13 wherein said glass article having the integral surface layer containing hematite crystals is exposed to a dry reducing environment at a temperature between about 450°–650° C. for about 1–12 hours.

18. A method according to claim 17 wherein said glass article is exposed to a dry reducing environment at a temperature between about 500°–600° C. for about 2–5 hours.

19. A method according to claim 13 wherein said surface layer is no more than about 2000A thick.

* * * * *

UNITED STATES PATENT OFFICE
CERTIFICATE OF CORRECTION

PATENT NO. : 4,084,973
DATED : April 18, 1978
INVENTOR(S) : Ronald L. Andrus and Richard F. Reade It is certified that error appears in the above–identified patent and that said Letters Patent are hereby corrected as shown below:

Column 1, line 39, "invention," should be -- applicants, --.

Column 2, line 10, "35-70 x $10^7/°C.$," should be -- 35-70 x $10^{-7}/°C.$, --.

Column 2, line 56, "x $10^7/°C.$" should be -- x $10^{-7}/°C.$ --.

Column 4, line 19, "firing" should be -- fining --.

Column 9, line 54, "indicatecd" should be -- indicated --.

Column 10, line 63, "fof" should be -- of --.

Column 12, line 16, "component" should be -- competent --.

Signed and Sealed this

Thirteenth Day of February 1979

[SEAL]

Attest:

RUTH C. MASON
Attesting Officer

DONALD W. BANNER
Commissioner of Patents and Trademarks